United States Patent Office 3,472,560
Patented Oct. 14, 1969

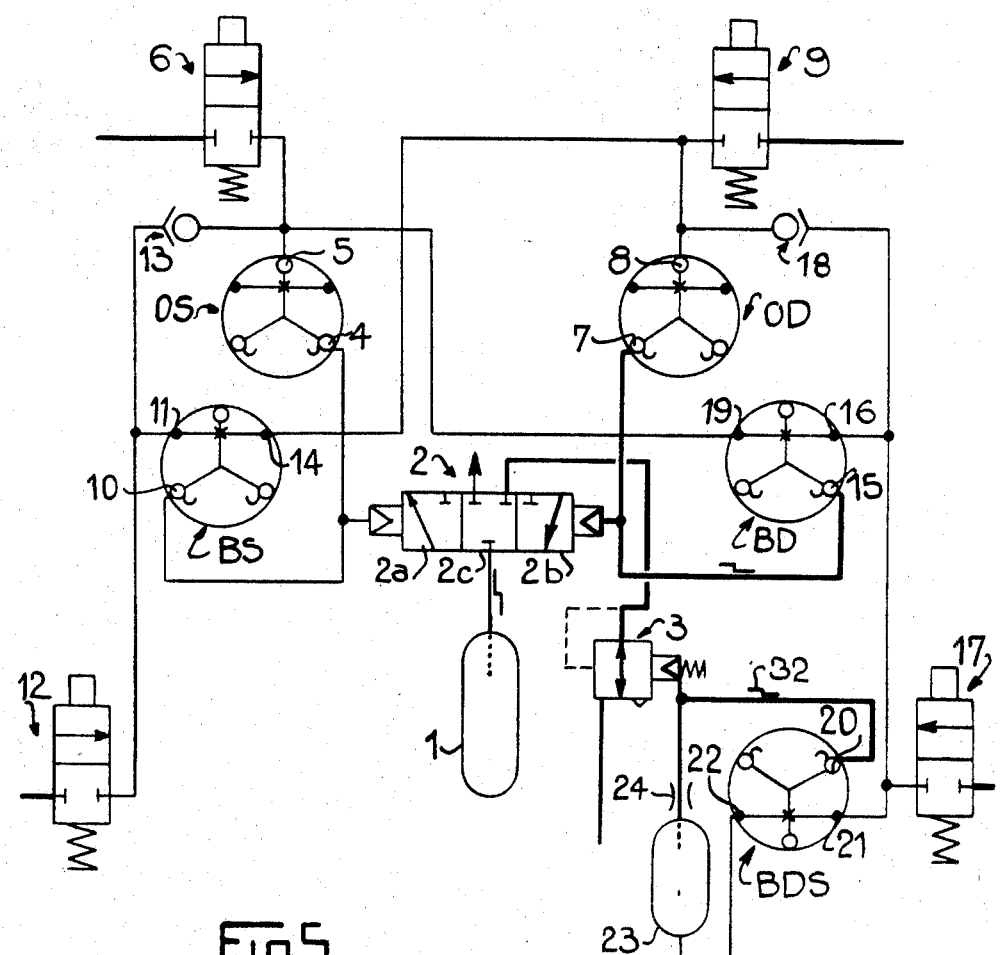

3,472,560
FLUID PRESSURE BRAKE CONTROL APPARATUS
FOR RAILWAY CARS
Jean-Pierre Desthuilliers, Chelles, France, assignor to
Compagnie des Freins et Signaux Westinghouse,
Freinville, Sevran, France
Filed Dec. 21, 1967, Ser. No. 692,367
Claims priority, application France, Dec. 23, 1966,
88,755
Int. Cl. B60t 17/02, 15/16
U.S. Cl. 303—13                                10 Claims

ABSTRACT OF THE DISCLOSURE

Fluid pressure brake control apparatus for railway cars in which manually operable push valves effect operation of interconnected pure fluid devices which in turn control a pressure operated three position valve means to effect fluid pressure changes in a brake pipe to apply or release fluid pressure operated brake means on railway cars.

BACKGROUND OF INVENTION

Heretofore, it has been proposed to combine electrically responsive brake control systems with fluid pressure operated brake means, thus giving rise to the problem of adapting the electrical system to operate the fluid pressure responsive brake mechanism.

It is the object of the present invention to provide a simple, reliable and safe brake control system having a minimum number of moving parts and utilizing interconnected pure fluid devices operable to control brake pipe pressure in a conventional fluid pressure operated system for applying and releasing the brakes in a conventional manner previously effected by a complicated engineer's brake valve device.

SUMMARY OF THE INVENTION

In the present invention, this object is achieved by utilizing a pressure operated three-way valve device operable to a first position from a neutral position to communicate the brake pipe equalizing reservoir with atmosphere, and operable in a second position from a neutral position to communicate the brake pipe equalizing reservoir with the main reservoir. A pressure reducing relay is disposed to communicate the main reservoir with the equalizing reservoir when the three-way valve device is disposed in the second position. The three-way valve device is biased to the neutral position and is selectively operable to the first and second positions by a push valve operated fluid pressure control system comprised of interconnected conventional pure fluid devices, which devices heretofore have been commercially known as fluid amplifiers or fluidic devices or fluid logic elements.

The fluid pressure control system is subdivided into a plurality of sub-systems, comprising, a service brake applying system including a fluidic oscillator pressurizable by operation of a manually operable push valve to oscillate the three-way valve between the first and neutral positions to progressively reduce pressure in the brake pipe, a service brake release system including a fluidic oscillator pressurizable by operation of a manually operable push valve to oscillate the three-way valve between the second and neutral positions to progressively increase pressure in the brake pipe, an emergency brake release system including a fluidic flip-flop device pressurizable by operation of a manually operable push valve to hold the three-way valve in the first position to rapidly reduce pressure in the brake pipe, and an emergency brake release system pressurizable by operation of a manually operable push valve to hold the three-way valve in the second position for rapidly charging the brake pipe. The fluid pressure sub-systems are interlocked to prevent brake release operation of the three-way valve during a brake applying operation thereof, and vice versa.

This and other objects of the invention will become more readily apparent in the following description, taken in conjunction with the drawing, in which.

Figure 1:
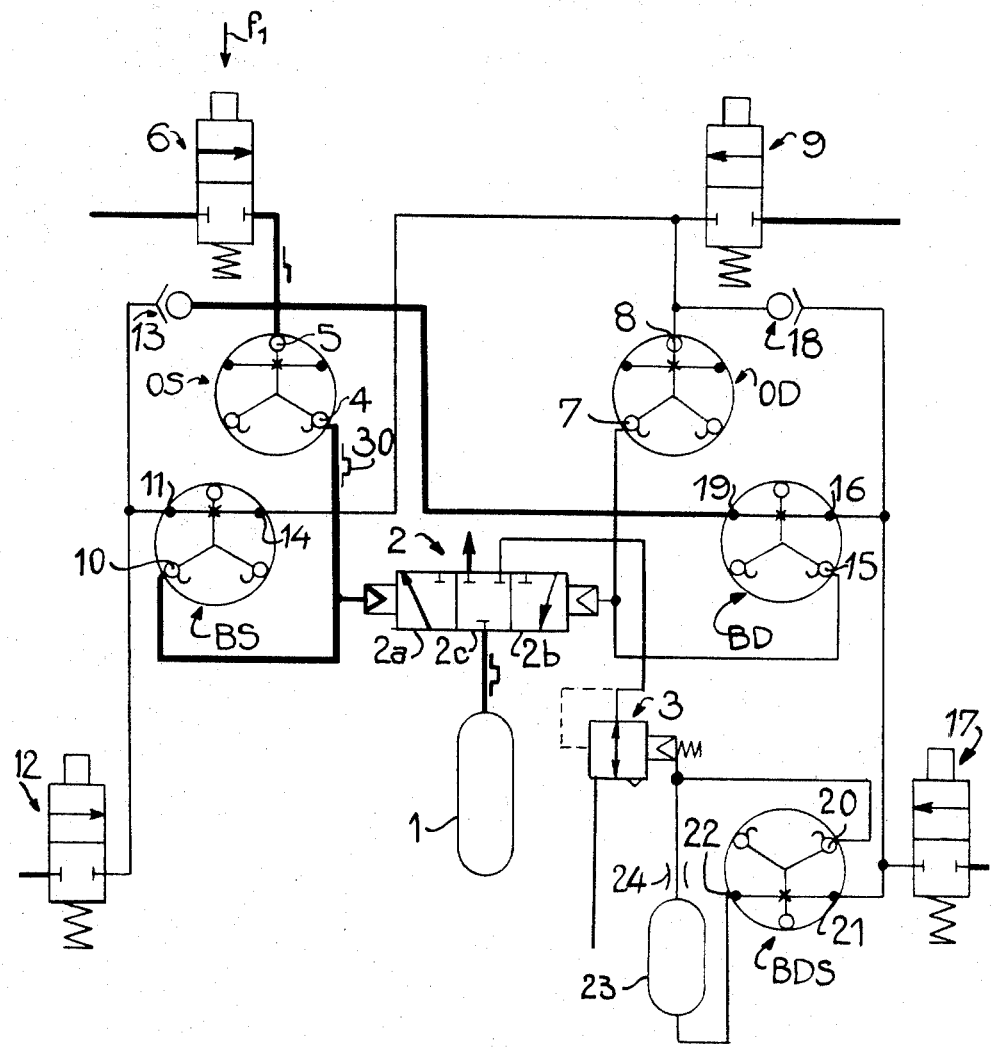
FIG. 1 is a schematic diagram of a fluid pressure brake control apparatus, showing my invention and illustrating the operational conditions of the components thereof during a gradual or service brake operation thereof.
Figure 4:
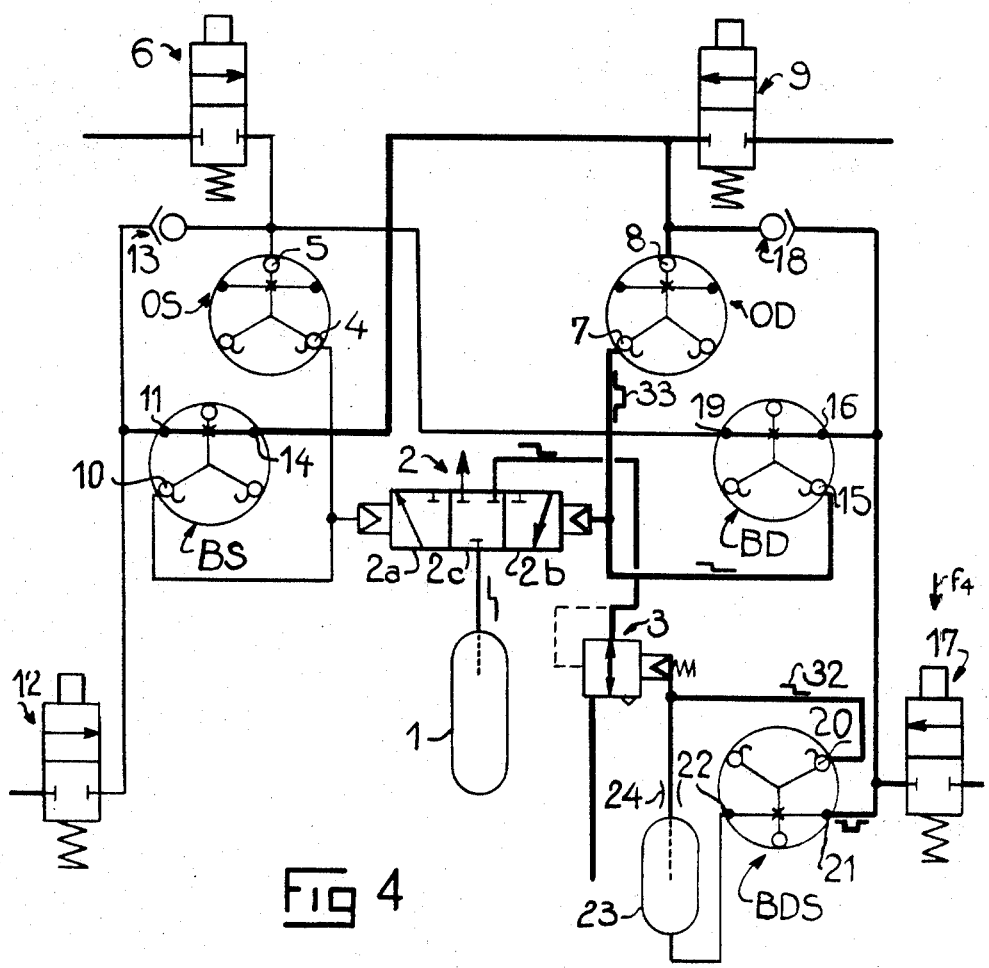

FIG. 4 is a schematic diagram of the fluid pressure brake control apparatus of FIG. 1, illustrating the operational conditions of the components thereof during initiation of an emergency brake release operation; and FIG. 5 is a schematic diagram of the fluid pressure brake control apparatus of FIG. 1, illustrating the operational conditions of the components thereof after initiation of the emergency brake release operation.

In this application, the term "fluidic oscillator" relates to a pure fluid device of any commercially available type which, in response to a steady fluid supply at an input port, produces fluid pressure pulses alternately at each of two output ports.

In this application the term "fluidic flip-flop" relates to a bistable pure fluid device of any commercially available type in which pressurization of either of two control inputs pressurizes a corresponding one of two outputs, which one output remains pressurized after the controlling input pressure is removed and until the other of said two control inputs is pressurized effecting depressurization of the one input and pressurization of the corresponding other one of the two outputs.

Referring now to drawing, and particularly to FIG. 1, there is shown an equalizing reservoir 1 connected to a three-way valve 2, the first or leftward position 2a of which connects the equalizing reservoir 1 to the atmosphere, the second or rightward position 2b of which connects the reservoir 1 to a main reservoir, not shown, through a pressure-reducing relay 3, and the neutral or middle position 2c of which isolates the equalizing reservoir from the remainder of the apparatus.

It is to be understood that the pressure in the equalizing reservoir 1 is reproduced in the train brake pipe, not shown, by way of a relay device, not shown, fed by the main reservoir, not shown, in a manner heretofore well known.

In now describing the structure of the service brake release system, it will be seen that the three-way valve 2 is moved to the position 2a by way of pressure delivered from one of the outlets 4 of a braking oscillator comprised of a fluidic oscillator OS, the input passage 5 of which is communicated to a source of fluid pressure, not shown, by way of an off-on switch comprised of a push valve 6. As shown in the drawing, when the push valve 6 is compressed by force $f_1$, fluid is passed unidirectionally to the oscillator OS, and, when released, isolates the oscillator from the fluid pressure source.

In now describing the structure of the service brake release system, it will be seen that the three-way valve 2 is moved to the position 2b by way of pressure supplied from one of the outputs 7 of an oscillator comprising a fluidic oscillator OD, the feed line 8 of which is connected to a source of fluid pressure, not shown, by operation of a push valve 9, identical to the previously described push valve 6.

In now describing the structure of the emergency braking circuit, it is seen that the outlet port 10 of a fluidic flip-flop BS is connected to provide pressure to dispose three-way valve 2 in the position 2a. The control inlet 11 of fluidic flip-flop BS is connected to a source of fluid under pressure, not shown, through a push valve device 12 of the off-on type and, which push valve 12 is, at the same time, connected to the input line 5 of the previously described braking oscillator OS through a unidirectional check valve 13 open in the direction to pass fluid from the push valve 12 to the fluidic oscillator OS. On the other hand, the opposing inlet or control port 14, which when pressurized switches the flip-flop BS to the off position, is connected to feed line 8 of the hereinbefore-described brake-releasing oscillator OD.

In now desribing the emergency brake releasing system, it is seen that this system is similar to the previously described emergency braking system and includes a fluidic flip-flop BD serving as the emergency brake releasing switch. The outlet 15 of emergency brake releasing switch BD, utilized to effect switching of the fluid flip-flop BD to the on position to pressurize output 15, is connected to the three-way valve 2 to provide pressure for moving the valve to position 2b.

The control input 16 of fluidic flip-flop BD is connected on one hand to a source of fluid pressure, not shown, by way of a push valve device 17 of the off-on type, and is connected on the other hand to the feed line 8 of the service brake-releasing fluidic oscillator OD by means of a unidirectional check valve 18 open in the direction from the push valve 17 to the fluidic oscillator OD. The other control inlet 19, which when pressurized turns the switch BD to the off position, is connected to feed line 5 of previously described fluidic oscillator OS.

In now describing the structure of the system for recharging the equalizing reservoir 1 after an emergency brake application, it is seen that the outlet 20, representing the on or pressurized output of a fluidic flip-flop switch BDS, is connected to the supplementary control member of a pressure reducing relay 3 disposed between the three-way valve 2 and the main reservoir, not shown. The control inlet 21, which when pressurized turns on the fluidic flip-flop BDS, is connected by the push valve 17 to the source of fluid presure, not shown. The control inlet 22, when pressurized as hereinafter described, switches fluidic flip-flop BDS to the off position, eliminating pressure at outlet 20. When fluidic flip-flop BDS is turned on by pressure at control inlet 21, outlet 20 provides pressure through a choke 24 to one end of a time delay reservoir 23 connected at the other end to control input 22.

In now describing the operation of the fluid pressure brake control apparatus for railway cars, as above described, it will be seen that the five figures of the drawing, FIGS. 1 through 5, each represents one phase of the operation of the apparatus, each phase corresponding to a particular operation. Thus, FIGS. 1 through 5 successively show the phases of operation from a gradual or service brake operation, to a gradual brake release operation, an emergency braking operation and a rapid brake release operation after an emergency braking operation. For each operation, the corresponding circuits which are in operation are shown in heavier lines.

Referring now to FIG. 1, the heavier lines illustrate which components of the control apparatus are in operation when the device is effecting a gradual or service brake operation. When push valve 6 is operated by the manual application of force as represented by arrow $f_1$, some fluid under pressure is admitted to the feed line 5 of the braking oscillator OS which immediately begins to oscillate and deliver at outlet 4 fluid impulses 30 having a rectangular shape, as indicated, periodically actuating the three-way valve 2 between the positions 2a and 2c, it being understood that the equalizing container 1 is isolated when the three-way valve 2 is disposed in the neutral position 2c, and that the three-way valve includes an automatic return means, not shown, for normally disposing the valve in the neutral position 2c. Therefore, the three-way valve 2 is oscillated between positions 2a and 2c for periodically connecting the equalizing reservoir 1 to atmosphere, thereby effecting a progressive braking operation of the brake mechanism, not shown.

The braking oscillator OS operates so long as the push valve 6 is in the depressed condition so that gradual braking of the train proceeds during the interim in which the push valve 6 is depressed. At the same time, an emergency brake-releasing operation is prevented due to the application of fluid pressure to control inlet 19 of the emergency braking switch BD, holding the switch BD in the off position.

Figure 2:
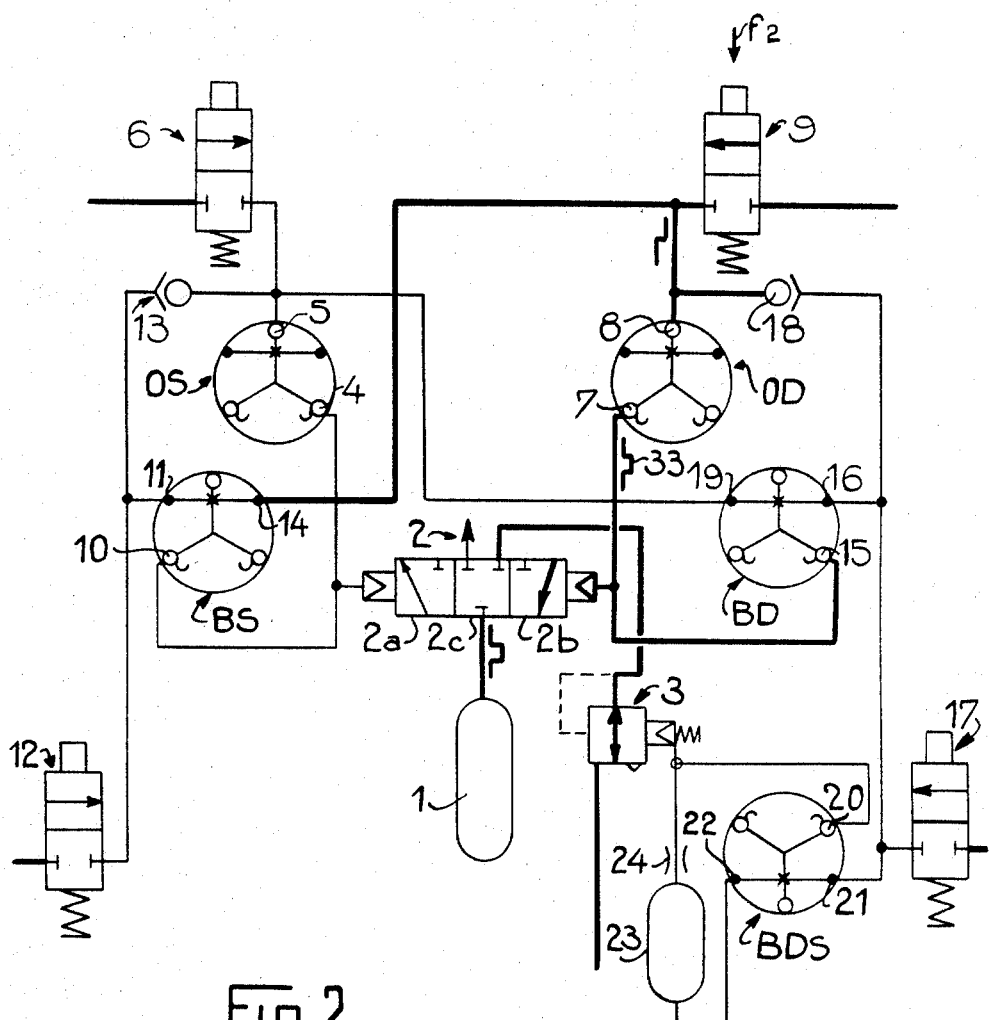
FIG. 2 is a schematic diagram of the fluid pressure brake control apparatus of FIG. 1, illustrating the operational conditions of the components thereof during a gradual or service brake release operation.

In now describing the operation of the apparatus for effecting a service brake release operation, reference is made to FIG. 2 wherein it is seen that the depression of push valve 9 by the application of a manual force represented by arrow $f_2$ provides a fluid pressure to the input 8 of fluidic oscillator OD which oscillates for the entire time the push valve 9 is depressed. The fluidic oscillator OD thus periodically operates the three-way valve between the positions 2b and 2c providing a periodical charging of the equalizing reservoir 1 from the main reservoir, not shown, through the relay valve 3. At the same time fluid under pressure is transmitted to emergency braking fluidic flip-flop BS at control input 14 to hold the same in the off position, thereby preventing the application of an emergency braking operation while the fluidic oscillator OD is functioning in the manner above described.

Figure 3:
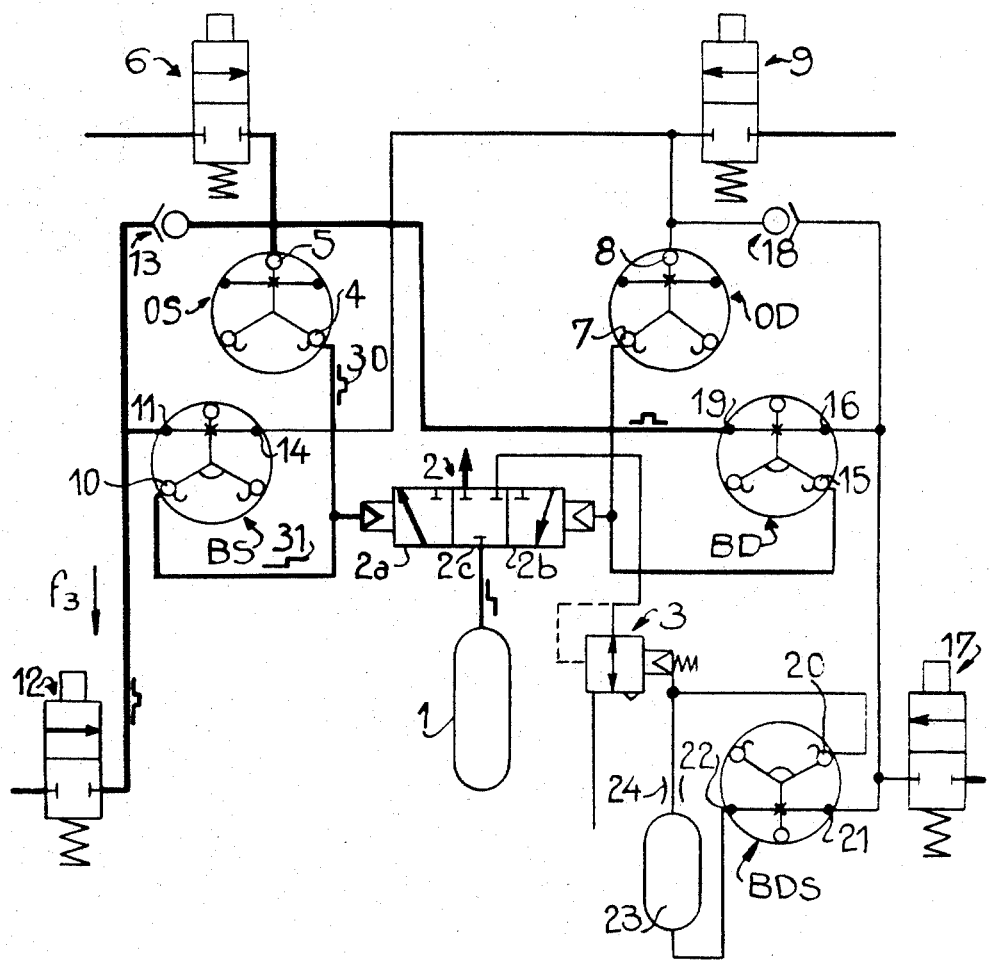
FIG. 3 is a schematic diagram of the fluid pressure brake control apparatus of FIG. 1, illustrating the operational conditions of the components thereof during an emergency brake release operation.

In now describing an emergency braking operation of the apparatus, reference is made to FIG. 3 of the drawing where it is seen that depressing the push valve 12 by the application of manual force represented by arrow $f_3$, some fluid under pressure is transmitted to the control input 11 of the emergency braking fluidic flip-flop BS and also to the input 5 of the fluidic oscillator OS, and further to the control inlet 19 of the brake releasing switch BD. Thus, fluidic flip-flop BS, originally turned off, is turned on and delivers via output 10 fluid a constant pressure to three-way valve 2 to thereby position the valve 2 in position 2a, venting the equalizing reservoir 1 to atmosphere. The pressure thus applied to dispose the three-way valve 2 in the position 2a is supplemented by the fluidic impulses sent to the three-way valve by way of the fluidic oscillator OS, which impulses add to the pressure supplied by the emergency braking fluidic flip-flop BS so that the three-way valve remains in the position 2a to continuously discharge the equalizing reservoir 1 to atmosphere.

A momentary push upon the push valve 12 is sufficient to actuate the fluidic flip-flop BS, which by its inherent operation remains in the on position, as above described, after the push valve 12 is released, to continuously vent the equalizing reservoir 1 to atmosphere. While the push valve 12 is in the depressed condition, fluid pressure supplied therethrough to control input 19 of the emergency brake release fluidic flip-flop BD holds the latter in the off position to prevent the operation of an emergency release operation while an emergency brake applying operation is in progress. When it is desired to stop the emergency brake applying operation, the fluidic flip-flop BS is turned off thereby shifting the three-way valve 2 to the neutral position 2c by depressing either push valve 9 of the service brake release operation, thereby providing a control signal to control input 14 switching fluidic flip-flop BS to the off position and neutralizing the three-way valve 2, or by pressing push valve 17 of the charging system which provides a signal through check valve 18 to control input 14 of fluidic flip-flop BS, thereby releasing the brakes and at the same time recharges the equalizing reservoir 1 as hereinafter described.

In now describing the operation of the apparatus to effect an emergency brake release operation, and, at the same time recharge the equalizing reservoir 1, reference is made to FIG. 4 of the drawing where it is seen that the application of a manual force to push valve 17, as represented by the arrow $f_4$, switches the emergency brake release fluidic flip-flop BD to the on position at control input 16 thereby applying a pressure at output 15 moving the three-way valve 2 to the 2b position, the fluidic flip-flop BD remaining in the on position even after manual release of the push valve 17. When the push valve 17 is first depressed, the fluidic flip-flop BDS turns on by virtue of the application of fluid pressure to the control inlet 21 and provides at outlet 20 a constant pressure 32 which activates an overcharge control mechanism on the pressure reducing relay 3 and, at the same time transmits pressure via a choke 24 to the delay reservoir 23. The fluid pressure thus provided by fluidic flip-flop BDS overrides the spring mechanism in relay 3 thus overriding the pressure regulation operation of relay 3 to provide a rapid charging of the equalizing reservoir 1 at an accelerated rate greater than that normally provided. Thus, it is seen, that when the push valve 17 is released, the charging of the equalizing reservoir 1 progresses automatically to an overcharged condition since the operation of the regulator in relay valve 3 is temporarily nullified by the presence of fluid pressure 32.

In now describing the operation of the apparatus in recharging equalizing reservoir 1 after release of the push valve 17, reference is made to FIG. 5 of the drawing where it is seen that the recharging of equalizing reservoir 1 is automatically stopped when time delay reservoir 23 is pressurized to an extent sufficient to provide an input control signal at inlet 22 of charging fluidic flip-flop BDS, switching it to the off position, thus eliminating the output at 20. At this point, any excess pressure in the equalizing reservoir 1 is released through release of the control mechanism in pressure-reducing relay 3.

It is to be understood that the length and spacing of the fluid pressure impulses 30 and 33, as delivered by the fluidic oscillators OS and OD, as previously described, may be varied or modulated, as desired, by any means heretofore known.

If desired, the control system may be simplified so as to include only the service brake system and the service brake release system or any of the other above systems taken singly or in combination. For example, the system may be comprised only of the three-way valve 2 and the two fluidic oscillators OS and OD, connected in the manner indicated with the two push valves 6 and 9. Alternatively, the system may be comprised only of the fluidic flip-flops BS and BD and the corresponding push valves 12 and 17, respectively.

Also, if desired, safety devices, not shown, may be added as desired without significant modification of the system disclosed.

Having now described the invention, what I claim as new and desire to secure by Letters Patent is:

1. A fluid pressure brake control apparatus for railway cars, comprising:
   (a) a fluid pressure operated three-way valve device biased to a neutral position and selectively operable to a first position and a second position;
   (b) an equalizing reservoir connected to said three-way valve for venting to atmosphere when said valve is disposed in said first position and for connection to a pressure-reducing relay valve device when said three-way valve is disposed in said second position;
   (c) a service brake applying system operable to provide fluid pressure pulses to oscillate said three-way valve between said first and said neutral positions; and
   (d) a service brake release system operable to oscillate said three-way valve between said neutral and said second positions.

2. A fluid pressure brake control apparatus for railway cars, as recited in claim 1, in which, each of said service brake applying system and said service brake release system includes a fluidic oscillator and a push valve operable for connecting the corresponding fluidic oscillator to a source of fluid pressure for effecting oscillation thereof.

3. A fluid pressure brake control apparatus for railway cars, as recited in claim 2, in which,
   (a) each push valve is operable to provide fluid pressure to the supply input of the corresponding fluidic oscillator; and
   (b) an output of each fluidic oscillator is connected to provide fluid pressure pulses to oscillate the three-way valve between neutral and the corresponding one of said first and said second positions.

4. A fluid pressure brake control apparatus for railway cars, as recited in claim 1, in combination with
   (a) an emergency brake applying system operable to provide fluid pressure to hold said three-way valve in said first position; and
   (b) an emergency brake release system operable to provide fluid pressure to hold said three-way valve in said second position.

5. A fluid pressure brake control apparatus for railway cars, as recited in claim 4, in which:
   (a) means operable in response to operation of said service brake applying system prevents operation of said emergency brake release system; and
   (b) means operable in response to operation of said service brake release system prevents operation of said emergency brake applying system.

6. A fluid pressure brake control apparatus for railway cars, as recited in claim 4, in which:
   (a) each of said emergency brake applying system and said emergency brake release system includes a fluidic flip-flop and a push valve operable for connecting the corresponding fluidic flip-flop to a source of fluid pressure to effect operation of the corresponding fluidic flip-flop to move the three-way valve from the neutral position to the corresponding one of said first and said second positions.

7. A fluid pressure brake control apparatus for railway cars, as recited in claim 6, in which:
   (a) each fluidic flip-flop has one of two control inputs connected for pressurization through operation of the corresponding push valve to provide pressure at one of two outputs connected to provide pressure to move said three-way valve to the corresponding one of said first and said second positions.

8. A fluid pressure brake control apparatus for railway cars, as recited in claim 7, in which:
   (a) the other of said two inputs of the fluidic flip-flop in said emergency brake release system is connected for pressurization by operation of the push valve in said emergency brake applying system; and
   (b) the other input of said two inputs of said emergency brake applying system is connected for pressurization by operation of either the push valve in said service brake release system or the push valve in said emergency brake release system.

9. A fluid pressure brake control apparatus for railway cars, as recited in claim 4, in which:
   (a) said pressure-reducing relay includes two operating positions and is normally operable in one of said two operating positions to pass pressure from a main reservoir at a predetermined rate and is operable to a second of said two positions in response to application of a control pressure to pass fluid at a higher rate; and
   (b) an equalizing reservoir charging system operable in response to operation of the push valve in said emergency brake release system to provide said control pressure to hold said pressure-reducing relay in said second operating position for a time sufficient to recharge the equalizing reservoir.

10. A fluid pressure brake control apparatus for railway cars, as recited in claim 8, in which:
 (a) said pressure-reducing relay comprises a two-position device normally operable in one of said two positions to pass pressure from a main reservoir at a predetermined rate and operable in response to application of a control pressure thereto to a second of said two positions to pass fluid at a higher rate;
 (b) an equalizing reservoir charging system operable in response to operation of the push valve in said emergency brake release system to provide said control pressure to hold said pressure-reducing relay in said second position for a time sufficient to recharge the equalizing reservoir;
 (c) said equalizing reservoir charging system including a fluidic flip-flop having one of two control inputs connected for pressurization by operation of said push valve in said emergency brake release system to provide said control pressure at one of two outputs; and
 (d) a time delay reservoir connected between said one of two outputs of said charging system fluidic flip-flop and the other of said two inputs of said reservoir charging fluidic flip-flop.

References Cited
UNITED STATES PATENTS

| | | | |
|---|---|---|---|
| 2,055,102 | 9/1936 | Hewitt | 303—61 X |
| 2,846,273 | 8/1958 | Sexton et al. | 303—66 |

DUANE A. REGER, Primary Examiner

U.S. Cl. X.R.

303—61, 66, 80